US012624871B2

(12) United States Patent    (10) Patent No.:   US 12,624,871 B2

He et al.      (45) Date of Patent:    May 12, 2026

(54) ELECTRONIC EXPANSION VALVE

(71) Applicant: ZHEJIANG DUNAN ARTIFICIAL ENVIRONMENT CO., LTD., Shaoxing (CN)

(72) Inventors: Yuchen He, Shaoxing (CN); Guanjun Xu, Shaoxing (CN); Yonghao Chen, Shaoxing (CN); Hongfeng Huang, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 157 days.

(21) Appl. No.: 18/697,464

(22) PCT Filed: Sep. 30, 2022

(86) PCT No.: PCT/CN2022/123584
§ 371 (c)(1),
(2) Date: Mar. 30, 2024

(87) PCT Pub. No.: WO2023/051825

PCT Pub. Date: Apr. 6, 2023

(65) Prior Publication Data

US 2024/0401856 A1     Dec. 5, 2024

(30) Foreign Application Priority Data

Sep. 30, 2021    (CN) ......................... 202111166805.X
Sep. 30, 2021    (CN) ......................... 202122404589.X
(Continued)

(51) Int. Cl.
*F16K 31/50*      (2006.01)
*F16K 27/02*      (2006.01)
(Continued)

(52) U.S. Cl.
CPC ............ *F25B 41/34* (2021.01); *F16K 27/029* (2013.01); *F16K 31/04* (2013.01); *F16K 31/047* (2013.01); *F16K 31/504* (2013.01); *F16K 31/508* (2013.01)

(58) Field of Classification Search
USPC ................................................... 251/129.11
See application file for complete search history.

(56) References Cited

U.S. PATENT DOCUMENTS 7,494,108 B2 * 2/2009 Inoue ...................... F16K 31/04
251/129.11
8,720,486 B2 * 5/2014 Uchida ................... F16K 31/04
62/77
(Continued)

FOREIGN PATENT DOCUMENTS

CN       1297518 A     5/2001
CN    209180369 U     7/2019
(Continued)

OTHER PUBLICATIONS

The first office action of counterpart CN application No. 202111166805.X issued on Aug. 2, 2025.
(Continued)

*Primary Examiner* — Matthew W Jellett
(74) *Attorney, Agent, or Firm* — The Sun IP Law

(57) ABSTRACT

An electronic expansion valve, including a valve body, the valve body having an accommodating cavity and a valve port, and the accommodating cavity being in communication with the valve port; a rotor arranged in the accommodating cavity; a stator assembly; a screw rod assembly arranged in the accommodating cavity, the screw rod assembly including a screw rod and a nut sleeve, the rotor being fixedly connected to an end of the screw rod away from the valve port; and a valve sleeve, the screw rod being in driving connection with the valve sleeve, where when the valve port (Continued)

is in a fully open state, the number of pulses is A, and when a central line of the stator assembly coincides with a central line of the rotor, the corresponding number of pulses is B, where $0.3*A \leq B \leq 0.7*A$.

19 Claims, 11 Drawing Sheets

(30)         Foreign Application Priority Data

Sep. 30, 2021  (CN) ......................... 202122405095.3
Sep. 30, 2021  (CN) ......................... 202122411352.4

(51) Int. Cl.
    *F16K 31/04*        (2006.01)
    *F25B 41/34*        (2021.01)

(56)         References Cited

U.S. PATENT DOCUMENTS

| | | | |
|---|---|---|---|
| 9,541,315 B2 * | 1/2017 | Zhan ....................... | F25B 41/35 |
| 9,689,595 B2 * | 6/2017 | Zhan ....................... | F25B 41/38 |
| 9,726,406 B2 * | 8/2017 | Sekiguchi ............... | F25B 41/35 |
| 11,329,531 B2 * | 5/2022 | Billet ....................... | F25B 41/35 |
| 2012/0091375 A1 * | 4/2012 | Suganuma ................ | F16K 1/54 |
| | | | 251/129.01 |

| | | | |
|---|---|---|---|
| 2014/0353391 A1 * | 12/2014 | Burklin ................... | F25B 41/35 |
| | | | 236/92 B |
| 2018/0238455 A1 * | 8/2018 | Yazawa ................. | F16K 31/508 |
| 2020/0208893 A1 * | 7/2020 | Zhang ..................... | F25B 41/31 |
| 2021/0071921 A1 | 3/2021 | Wang | |

FOREIGN PATENT DOCUMENTS

| | | | |
|---|---|---|---|
| CN | 210372066 U | 4/2020 | |
| CN | 111271475 A | 6/2020 | |
| CN | 111379864 A | 7/2020 | |
| CN | 216200581 U | 4/2022 | |
| JP | 2001271956 A | 10/2001 | |
| JP | 2003148644 A | 5/2003 | |
| JP | 2003329698 A | 11/2003 | |
| JP | 2004332818 A | 11/2004 | |
| JP | 2012197849 A | 10/2012 | |
| JP | 2019124318 A | 7/2019 | |
| WO | 2019091484 A1 | 5/2019 | |

OTHER PUBLICATIONS

The first office action of counterpart EP application No. 22875205 issued on Jul. 18, 2025.
The first office action of counterpart JP application No. 2024-517390 issued on Apr. 1, 2025.
David J Robinson et al: Dynamic Analysis of Permanent Magnet Stepping Motors, NASA Technical Note D-5094, Mar. 1969.

* cited by examiner

ELECTRONIC EXPANSION VALVE

CROSS-REFERENCE TO RELATED APPLICATION

The present disclosure claims the priority to the patent application No. 202122405095.3 entitled "Electronic Expansion Valve", the patent application No. 202122404589X entitled "Electronic Expansion Valve", the patent application No. 202111166805X entitled "Electronic Expansion Valve", and the patent application No. 2021224113524 entitled "Electronic Expansion Valve", filed on Sep. 30, 2021 to Chine National Intellectual Property Administration.

TECHNICAL FIELD

The present disclosure relates to the technical field of control valves, in particular to an electronic expansion valve.

BACKGROUND

An electronic expansion valve includes a valve body, a rotor, a stator assembly, a screw rod assembly, a valve sleeve, and other components. The valve body has a cavity and a valve port, the rotor is arranged in the cavity, the rotor is connected with the screw rod assembly, the screw rod assembly is connected with the valve sleeve, the stator assembly is arranged outside the valve body, the stator assembly is arranged corresponding to the rotor, the stator assembly interacts with the rotor to enable the rotor to drive the screw rod assembly, and the rotor and the screw rod assembly do linear motion along an axis of the valve body, so as to drive the valve sleeve to block or open the valve port. The larger an area of a winding of the stator assembly directly facing the rotor is, the larger driving forces of the stator assembly and the rotor are. In a prior art, the positions of the stator assembly and the rotor are generally designed in that when the valve port is in a fully close state, the area of the rotor directly facing the stator assembly is maximum, and the driving force of the rotor driving the screw rod assembly to move is maximum. According to the above solution, when the valve body is in a fully open state, the area of the rotor directly facing the stator assembly is too small, resulting in that the valve sleeve is out-of-step or the valve port cannot be closed.

SUMMARY

The present disclosure provides an electronic expansion valve to solve the problem that when the electronic expansion valve in the prior art is in a fully open state, the driving force is relatively weak.

The present disclosure provides an electronic expansion valve, including a valve body, the valve body having an accommodating cavity and a valve port, and the accommodating cavity being in communication with the valve port; a rotor, the rotor being arranged in the accommodating cavity; a stator assembly, the stator assembly being arranged outside the valve body in a sleeving manner, and the stator assembly being arranged corresponding to the rotor; a screw rod assembly, the screw rod assembly being arranged in the accommodating cavity, the screw rod assembly comprising a screw rod and a nut sleeve, the nut sleeve being fixed to the valve body, the screw rod being arranged in the nut sleeve in a penetrating manner and being in threaded connection with the nut sleeve, the rotor being fixedly connected to an end of the screw rod away from the valve port, and the rotor driving the screw rod to rotate along the nut sleeve such that the screw rod and the rotor move in a direction toward or away from the valve port; and a valve sleeve, the screw rod being in driving connection with the valve sleeve, and the valve sleeve being used to block or open the valve port, wherein when the valve port is in a fully close state, a number of pulses is 0, when the valve port is in a fully open state, a number of pulses is A, and when a central line of the stator assembly that is perpendicular to an axis coincides with a central line of the rotor that is perpendicular to the axis, a corresponding number of pulses is B, wherein $0.3*A \le B \le 0.7*A$. In an embodiment, B may be $0.3*A$, $0.4*A$, $0.5*A$ or $0.7*A$.

By applying the technical solution of the present disclosure, when the central line of the stator assembly that is perpendicular to the axis coincides with that of the rotor that is perpendicular to the axis, the force of the rotor driving the screw rod to rotate is maximum. If the number of pulses is less than $0.3*A$, the driving force of the rotor is maximum when the valve port is close to be in a fully close state, that is, the driving force becomes weaker and weaker in the process of opening the valve port, resulting in that the valve port is slowly closed or cannot be fully closed. If the number of pulses is greater than $0.7*A$, the driving force of the rotor is maximum when the valve port is close to be in a fully open state, that is, the driving force becomes weaker and weaker in the process of closing the valve port, resulting in that the valve port is slowly opened or cannot be fully opened. Therefore, the relationship between A and B is set to $0.3*A \le B \le 0.7*A$, and the driving force of the rotor is maximum when the valve port is in a semi-open state, such that the driving force is relatively balanced in the process of opening or closing the valve port, and then the valve port is opened or closed more reliably, thereby causing the valve port to be fully opened or closed.

In an embodiment, $B=0.5*A$. When $B=0.5*A$, the driving force of the rotor is maximum when the valve port is in a semi-open state, such that the driving force is balanced in the process of opening or closing the valve port, and then the valve port is opened or closed more reliably.

In an embodiment, a length of the rotor along an axial direction is L1, the stator assembly is provided with an upper pole plate and a lower pole plate that are arranged at an interval along the axial direction, and a distance between the upper pole plate and the lower pole plate is L2, wherein the L2 is greater than the L1. In such a way, the maximum driving force can continuously cover the stroke.

In an embodiment, $0.2 \text{ mm} \le L2-L1 \le 1 \text{ mm}$. Such arrangement can enable not only the maximum driving force to continuously cover the stroke but also the structure of the electronic expansion valve to be compact.

In an embodiment, an outer diameter of the rotor is D1, and an inner diameter of the accommodating cavity is D2, wherein $0.3 \text{ mm} \le D2-D1 \le 1 \text{ mm}$. This can enable not only the friction force with an inner wall of the accommodating cavity when the rotor rotates to be relatively small but also the driving force to be relatively large.

In an embodiment, an outer diameter of the valve body is D3, and an inner diameter of the stator assembly is D4, wherein $0.05 \text{ mm} \le D4-D3 \le 0.5 \text{ mm}$. Such arrangement can not only ensure that the stator assembly may be mounted on the valve body relatively conveniently but also enable the driving force to be relatively large.

In an embodiment, 13 mm≤D1≤18 mm. This may not only ensure that the driving force is relatively large but also enable the structure of the electronic expansion valve to be compact.

In an embodiment, 18 mm≤L1≤23 mm. This may not only ensure that the driving force is relatively large but also enable the length of the electronic expansion valve to be relatively small.

In an embodiment, a balancing channel is arranged in the valve sleeve, and the balancing channel can enable two ends of the valve sleeve to be communicated.

In an embodiment, the valve sleeve is internally provided with a through hole, the through hole includes a first hole section, a second hole section and a third hole section that are arranged in sequence, a diameter of the first hole section and a diameter of the third hole section are greater than a diameter of the second hole section, an end of the screw rod close to the valve port is arranged in the third hole section in a penetrating manner, a fixing piece is fixedly connected to an end of the screw rod close to the valve port, a diameter of the fixing piece is greater than the diameter of the second hole section, the fixing piece is arranged at an end of the third hole section away from the valve port, a connecting hole is formed in the fixing piece, an end part of the screw rod is arranged in the connecting hole in a penetrating manner, a first tangential structure is arranged on a side wall of the end of the screw rod close to the valve port, the first tangential structure extends to the first hole section, a first gap is formed between the first tangential structure and an inner wall of the through hole, a second gap is formed between the connecting hole and the first tangential structure, the first gap is in communication with the second gap, and the first gap and the second gap form the balancing channel, so as to balance air pressure at two ends of the valve sleeve.

BRIEF DESCRIPTION OF THE DRAWINGS

The accompanying drawings of the specification, which constitute a part of the present disclosure, are included to provide a further understanding of the present disclosure, and the illustrative embodiments and descriptions thereof are provided to explain the present disclosure, and are not intended to unduly limit the present disclosure. In the accompanying drawings.

Figure 1:
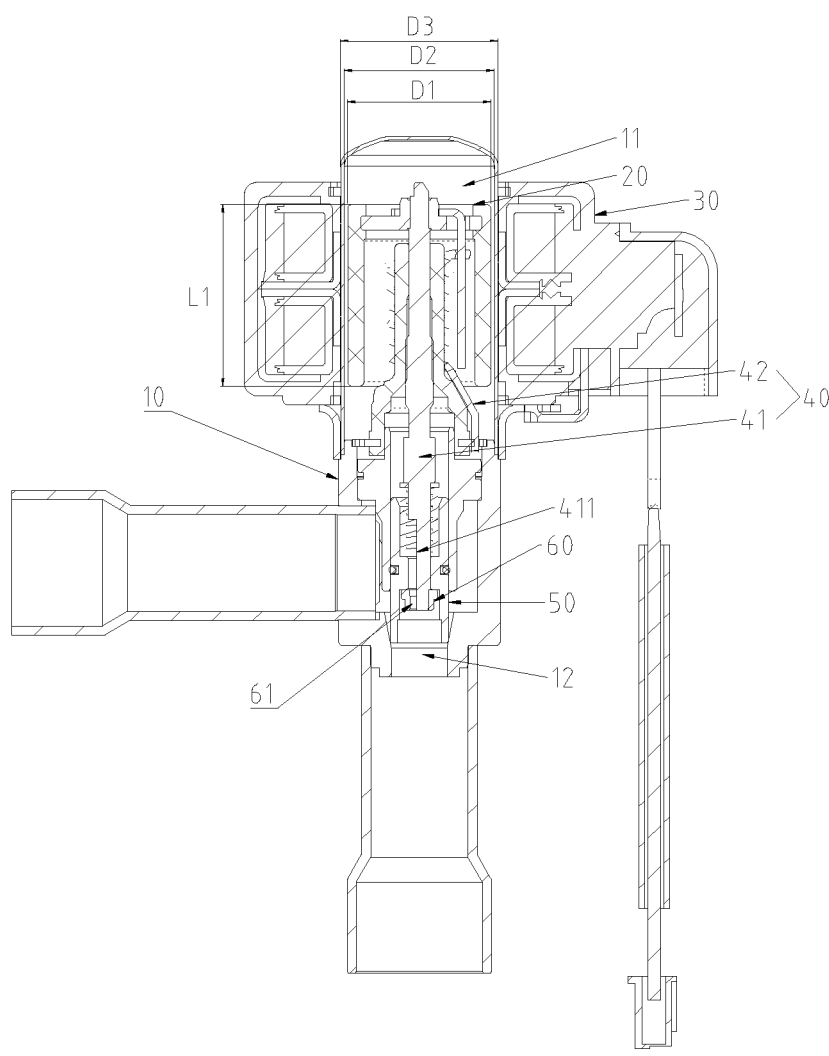
FIG. 1 shows a schematic structural diagram of an electronic expansion valve provided according to the present disclosure.

Where, the above accompanying drawings include the following reference numerals:

10. Valve body; 11. Accommodating cavity; 12. Valve port; 20. Rotor; 211. Rotor body; 221. Connecting end; 222. Driving end; 30. Stator assembly; 31. Upper pole plate; 32. Lower pole plate; 40. Screw rod assembly; 41. Screw rod; 411. First tangential structure; 42. Nut sleeve; 43. First section; 44. Second section; 45. Third section; 46. Second tangential structure; 50. Valve sleeve; 51. Through hole; 511. First hole section; 512. Second hole section; 513. Third hole section; 60. Fixing piece; 61. Connecting hole; 80. Rotor connecting plate; 81. Mounting hole.

DETAILED DESCRIPTION OF THE EMBODIMENTS

The technical solutions in the embodiments of the present disclosure will be clearly and completely described below with reference to the accompanying drawings in the embodiments of the present disclosure. Obviously, the described embodiments are only a part of the embodiments of the present disclosure, not all of the embodiments. The following description of at least one exemplary embodiment is merely illustrative in nature and is in no way intended to limit the present disclosure, its application, or uses. Based on the embodiments in the present disclosure, all other embodiments obtained by those of ordinary skill in the art without creative work are within the scope of protection of the present disclosure.

As shown in FIG. 1, an embodiment of the present disclosure provides an electronic expansion valve, including a valve body 10, a rotor 20, a stator assembly 30, a screw rod assembly 40, and a valve sleeve 50. The valve body 10 has an accommodating cavity 11 and a valve port 12, and the accommodating cavity 11 is in communication with the valve port 12. The rotor 20 is arranged in the accommodating cavity 11. The stator assembly 30 is arranged outside the valve body 10 in a sleeving manner, and the stator assembly 30 is arranged corresponding to the rotor 20. The screw rod assembly 40 is arranged in the accommodating cavity 11, the screw rod assembly 40 includes a screw rod 41 and a nut sleeve 42, the nut sleeve 42 is fixed to the valve body 10, the screw rod 41 is arranged in the nut sleeve 42 in a penetrating manner and is in threaded connection with the nut sleeve 42, the rotor 20 is fixedly connected with an end of the screw rod 41 away from the valve port 12, the rotor 20 drives the screw rod 41 to rotate along the nut sleeve 42, such that the screw rod 41 and the rotor 20 move along a direction toward or away from the valve port 12, the screw rod 41 is in driving connection with the valve sleeve 50, and the valve sleeve 50 is used to block or open the valve port 12. When the rotor 20 moves along a direction toward or away from the valve port 12, an area of the rotor 20 directly facing the stator assembly 30 changes, and a driving force of the rotor 20 changes accordingly. When the valve port 12 is in a fully close state, the number of pulses is 0, when the valve port 12 is in a fully open state, the number of pulses is A, and when a central line of the stator assembly 30 that is perpendicular to an axis coincides with a central line of the rotor 20 that is perpendicular to the axis, a corresponding number of pulses is B, where $0.3*A \leq B \leq 0.7*A$. In some embodiments, B may be $0.3*A$, $0.4*A$, $0.5*A$ or $0.7*A$.

By applying the technical solution of the present disclosure, when the central line of the stator assembly 30 that is perpendicular to the axis coincides with the central line of the rotor 20 that is perpendicular to the axis, a force of the rotor 20 driving the screw rod 41 to rotate is maximum. In a case that the number of pulses B is less than $0.3*A$, the force will be too small when a valve is in a fully open state, such that an out-of-step consequence is easily caused, and the valve cannot act. In a case that the number of pulses is larger than $0.7*A$, the force will be too small when the valve is in a fully close state, such that the valve port 12 cannot be opened. Therefore, a relationship between A and B is set to $0.3*A \leq B \leq 0.7*A$, and the driving force of the rotor 20 is maximum when the valve port 12 is close to be in a semi-open state, such that the driving force is relatively balanced in a process of opening or closing the valve port 12, and then the valve port 12 is opened or closed more reliably, thereby causing the valve port 12 to be fully opened or closed.

Where $B=0.5*A$. When $B=0.5*A$, the driving force of the rotor 20 is maximum when the valve port 12 is in the semi-open state, such that the driving force is balanced in the process of opening or closing the valve port 12, and then the valve port 12 is opened or closed more reliably.

In the present embodiment, a length of the rotor 20 along an axial direction is L1, the stator assembly 30 is provided with an upper pole plate 31 and a lower pole plate 32 that are arranged at an interval along the axial direction, and a distance between the upper pole plate 31 and the lower pole plate 32 is L2, where the L2 is greater than the L1. A winding is arranged between the upper pole plate 31 and the lower pole plate 32, a central line of the winding that is perpendicular to an axis coincides with the central line of the stator assembly 30 that is perpendicular to the axis, and the winding interacts with the rotor 20 to generate a driving force. If the L2 is less than the L1, an area of the winding directly facing the rotor 20 is relatively small, such that a maximum driving force is relatively small. Therefore, in a case that the L2 is greater than the L1, the maximum driving force can be ensured to be relatively large.

In some embodiments, $0.2 \text{ mm} \leq L2-L1 \leq 1 \text{ mm}$. In a case that $L2-L1 < 0.2 \text{ mm}$, a stroke covered continuously by the maximum driving force is relatively short in the process that the rotor 20 is close to or away from the valve port 12. In a case that $L2-L1 > 1 \text{ mm}$, a structural size of the stator assembly 30 is relatively large, such that an overall structural size of the electronic expansion valve is relatively large, which is not conducive to miniaturization design. Therefore, in a case that $0.2 \text{ mm} \leq L2-L1 \leq 1 \text{ mm}$, the stroke continuously covered by the maximum driving force can be relatively long, and the structure of the electronic expansion valve may be compact. In some embodiments, $L2-L1$ may be 0.2 mm, 0.4 mm, 0.6 mm or 1 mm.

In the present embodiment, an outer diameter of the rotor 20 is D1, and an inner diameter of the accommodating cavity 11 is D2, wherein $0.3 \text{ mm} \leq D2-D1 \leq 1 \text{ mm}$. If $D2-D1 < 0.3 \text{ mm}$, a gap between the rotor 20 and an inner wall of the accommodating cavity 11 is too small, such that a friction force with the inner wall of the accommodating cavity 11 when the rotor 20 rotates is too large, which affects a rotation of the rotor 20 and enables the rotor 20 to be worn. If $D2-D1 > 1 \text{ mm}$, a distance between the rotor 20 and the stator assembly 30 is too large, such that the driving force is reduced. Therefore, in a case that $0.3 \text{ mm} \leq D2-D1 \leq 1 \text{ mm}$, the friction force with the inner wall of the accommodating cavity 11 when the rotor 20 rotates is relatively small, and the driving force is relatively large. Particularly, $D2-D1$ may be 0.3 mm, 0.6 mm or 1 mm.

Figure 2:
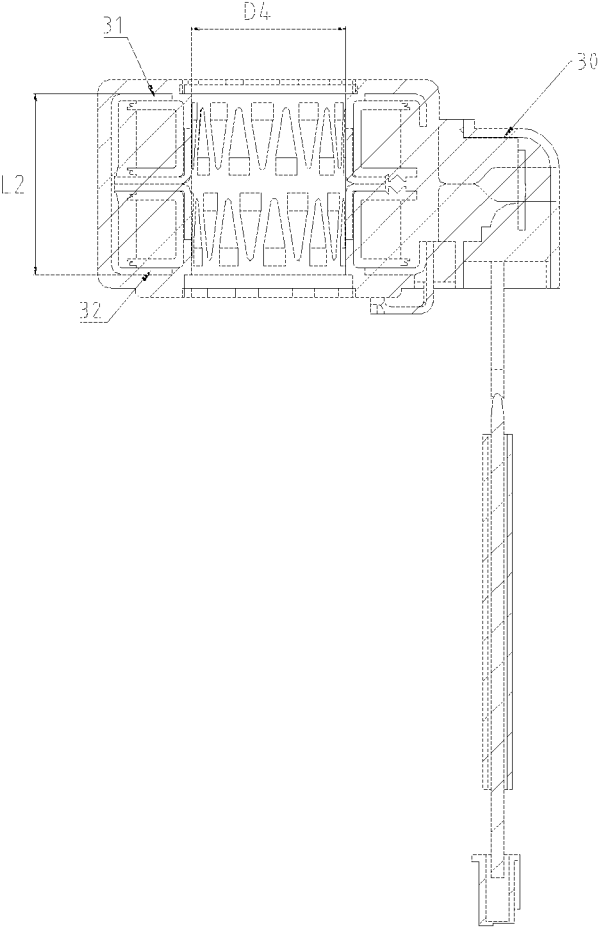
FIG. 2 shows a schematic structural diagram of a stator assembly provided according to the present disclosure.

As shown in FIG. 2, in the present embodiment, an outer diameter of the valve body 10 is D3, and an inner diameter of the stator assembly 30 is D4, wherein $0.05 \text{ mm} \leq D4-D3 \leq 0.5 \text{ mm}$. If $D4-D3 < 0.05 \text{ mm}$, a gap between the stator assembly 30 and the valve body 10 is too small, such that the stator assembly 30 is relatively difficult to be mounted on the valve body 10. If $D4-D3 > 0.5 \text{ mm}$, a gap between the stator assembly 30 and the valve body 10 is too large, such that a gap between the stator assembly 30 and the rotor 20 is too large, and then the driving force is reduced. Therefore, in a case that $0.05 \text{ mm} \leq D4-D3 \leq 0.5 \text{ mm}$, the stator assembly 30 can be ensured to be mounted on the valve body 10 relatively conveniently, and the driving force can be relatively large.

In some embodiments, $13 \text{ mm} \leq D1 \leq 18 \text{ mm}$. If $D1 < 13$ mm, a structural size of the rotor 20 is relatively small, and an action force between the rotor 20 and the stator assembly 30 is relatively weak, such that the driving force is relatively small. If $D1 > 18 \text{ mm}$, the structural size of the rotor 20 is relatively large, which is not conducive to miniaturization design of the electronic expansion valve. Therefore, in a case that $13 \text{ mm} \leq D1 \leq 18 \text{ mm}$, the driving force is ensured to relatively large, and the structure of the electronic expansion valve is compact. In the prior art, due to a relatively large pressure difference of two ends of the valve sleeve 50 in the process of opening the valve port 12 by the valve sleeve 50, a relatively large rotor 20 and stator assembly 30 are required to provide a large enough driving force to overcome the pressure difference to drive the valve sleeve 50 to fully open the valve port 12. Typically, the outer diameter of the rotor 20 used is in the range of 25 mm to 35 mm. In the present embodiment, since a balancing channel is arranged, the pressure at two ends of the valve sleeve 50 trends to be balanced in the process of opening the valve port 12 by the valve sleeve 50, such that the driving force provided by the rotor 20 and the stator assembly 30 may be reduced, and then in the present embodiment, the value range of the outer diameter D1 of the rotor 20 is set to $13 \text{ mm} \leq D1 \leq 18 \text{ mm}$. Therefore, the miniaturization design requirement of the electronic expansion valve is met.

In some embodiments, $18 \text{ mm} \leq L1 \leq 23 \text{ mm}$. If $L1 < 18 \text{ mm}$, the length of the rotor 20 is relatively small, and the action force between the rotor 20 and the stator assembly 30 is relatively weak, such that the driving force is relatively small. If $L1 > 23 \text{ mm}$, the length of the rotor 20 is relatively large, such that the length of the electronic expansion valve is relatively long. Therefore, in a case that $18 \text{ mm} \leq L1 \leq 23$ mm, the driving force may be ensured to be relatively large, and the length of the electronic expansion valve may be relatively small.

In the present embodiment, a balancing channel is arranged in the valve sleeve 50, and the balancing channel can enable two ends of the valve sleeve 50 to be communicated. The arrangement of the balancing channel can enable air pressure at two ends of the valve sleeve to be balanced, such that the valve sleeve 50 may be driven to open or close the valve port 12 with a relatively small driving force.

Figure 3:
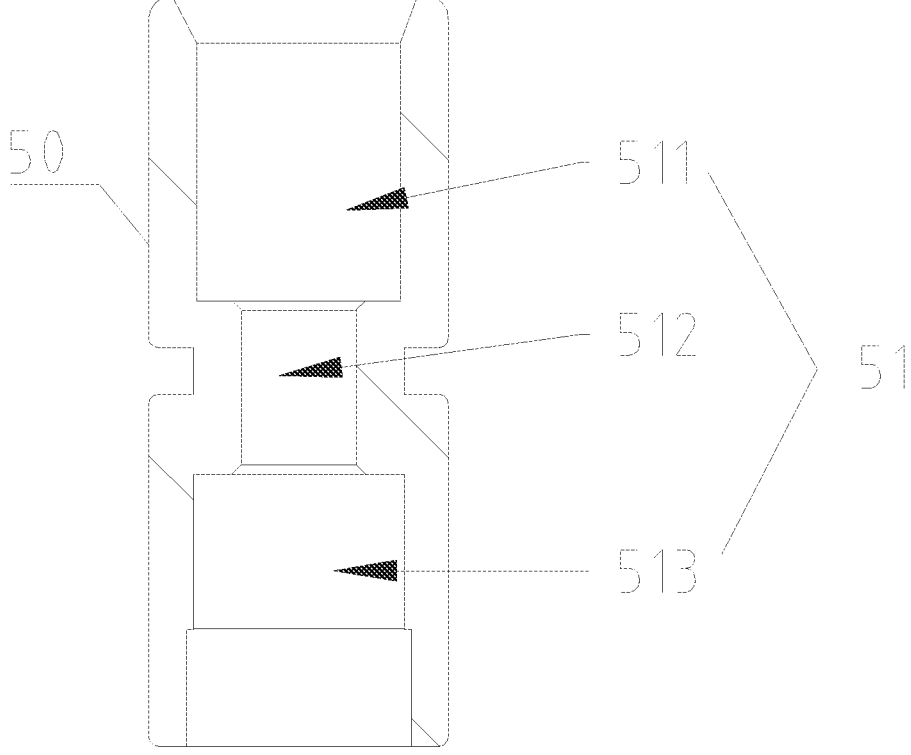
FIG. 3 shows a schematic structural diagram of a valve sleeve provided according to the present disclosure.

As shown in FIG. 3, the valve sleeve 50 is internally provided with a through hole 51, the through hole 51 includes a first hole section 511, a second hole section 512 and a third hole section 513 that are arranged in sequence, a diameter of the first hole section 511 and a diameter of the third hole section 513 are greater than a diameter of the second hole section 512, an end of the screw rod 41 close to the valve port 12 is arranged in the third hole section 513 in a penetrating manner, a fixing piece 60 is fixedly connected with the end of the screw rod 41 close to the valve port 12, a diameter of the fixing piece 60 is greater than the diameter of the second hole section 512, the fixing piece 60 is arranged at one end of the third hole section 513 away from the valve port 12, a connecting hole 61 is formed in the fixing piece 60, an end part of the screw rod 41 is arranged in the connecting hole 61 in a penetrating manner, a first tangential structure 411 is arranged on a side wall of the end of the screw rod 41 close to the valve port 12, the first tangential structure 411 extends to the first hole section 511, a first gap is formed between the first tangential structure 411 and an inner wall of the through hole 51, a second gap is formed between the connecting hole 61 and the first tangential structure 411, the first gap is in communication with the second gap, and the first gap and the second gap form the balancing channel, so as to balance air pressure at two ends of the valve sleeve 50. A diameter of the second hole section 512 is close to or the same as a diameter of the screw rod 41, so as to prevent the valve sleeve 50 from shaking relative to the screw rod 41. The first tangential structure 411 is arranged at the end of the screw rod 41 close to the valve port 12, and the first tangential structure 411 extends to the first hole section 511. The connecting hole 61 is formed in the fixing piece 60, and the connecting hole 61 is arranged corresponding to the first tangential structure 411, so as to balance air pressure at two ends of the valve sleeve 50. The arrangement of the connecting hole 61 and the first tangential structure 411 can enable the air pressure at two ends of the valve sleeve to be balanced, such that the valve sleeve 50 may be driven to open or close the valve port 12 with a relatively small driving force. Therefore, the relationship between A and B is set to $0.3*A \leq B \leq 0.7*A$, which can satisfy the driving effect as well as the driving force for the valve sleeve 50 at a fully open position and a closed position.

In the present embodiment, the length of the rotor 20 along an axial direction is L1, the stator assembly 30 is provided with the upper pole plate 31 and the lower pole plate 32 that are arranged at an interval along the axial direction, and a distance between the upper pole plate 31 and the lower pole plate 32 is L2, wherein the L2 is greater than the L1. A winding is arranged between the upper pole plate 31 and the lower pole plate 32, a central line of the winding that is perpendicular to an axis coincides with the central line of the stator assembly 30 that is perpendicular to the axis, and the winding interacts with the rotor 20 to generate a driving force. If the L2 is less than the L1, the area of the winding directly facing the rotor 20 is relatively small, such that the maximum driving force is relatively small. Therefore, the L2 is greater than the L1, the maximum driving force can be ensured to be relatively large.

Figure 4:
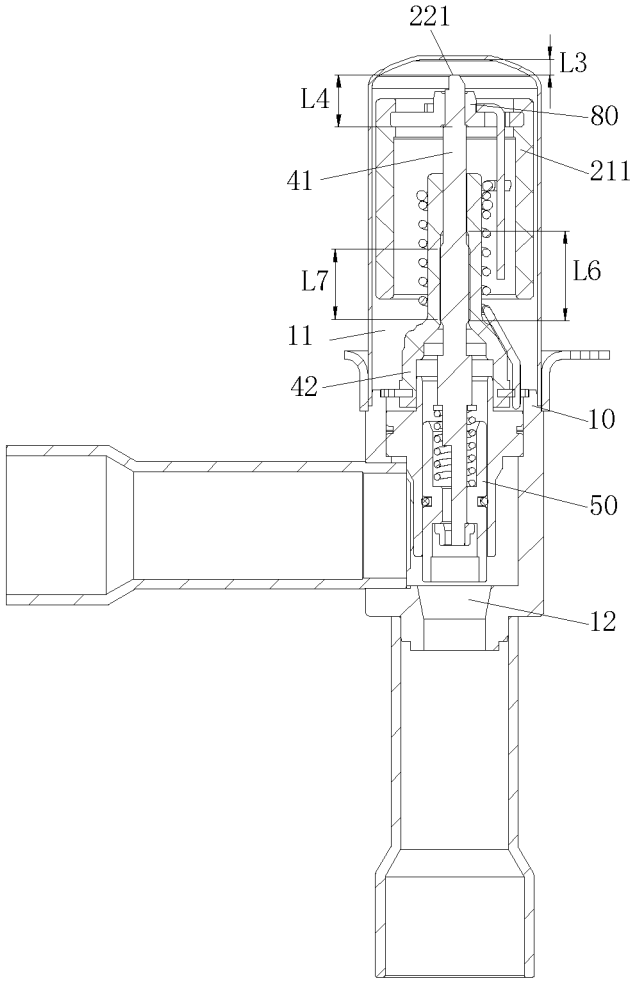
FIG. 4 shows a schematic structural diagram of an electronic expansion valve provided according to the present disclosure at a maximum opening position.
Figure 5:
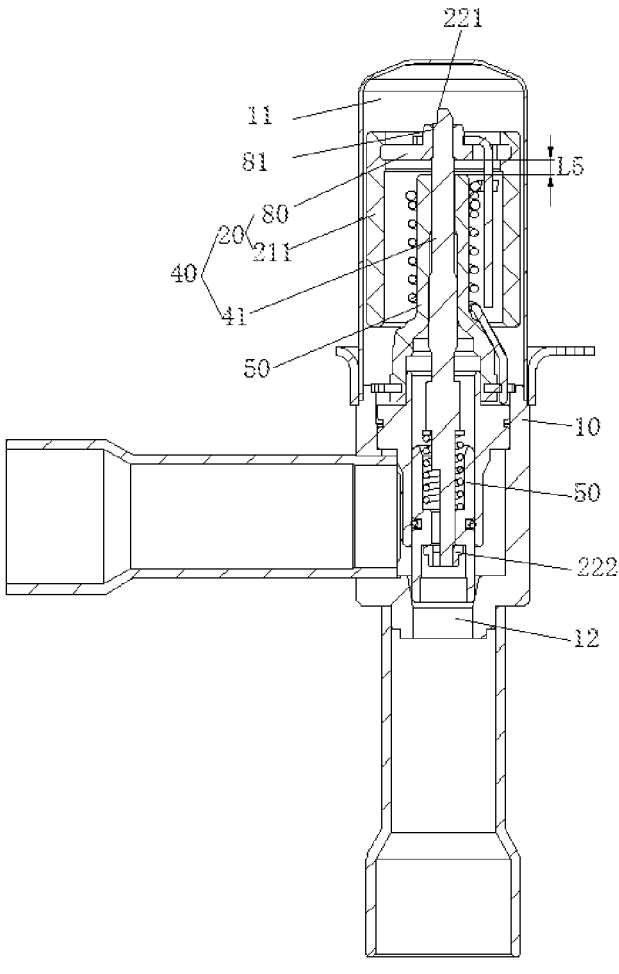
FIG. 5 shows a schematic structural diagram of an electronic expansion valve provided according to the present disclosure at a blocking position.
Figure 6:
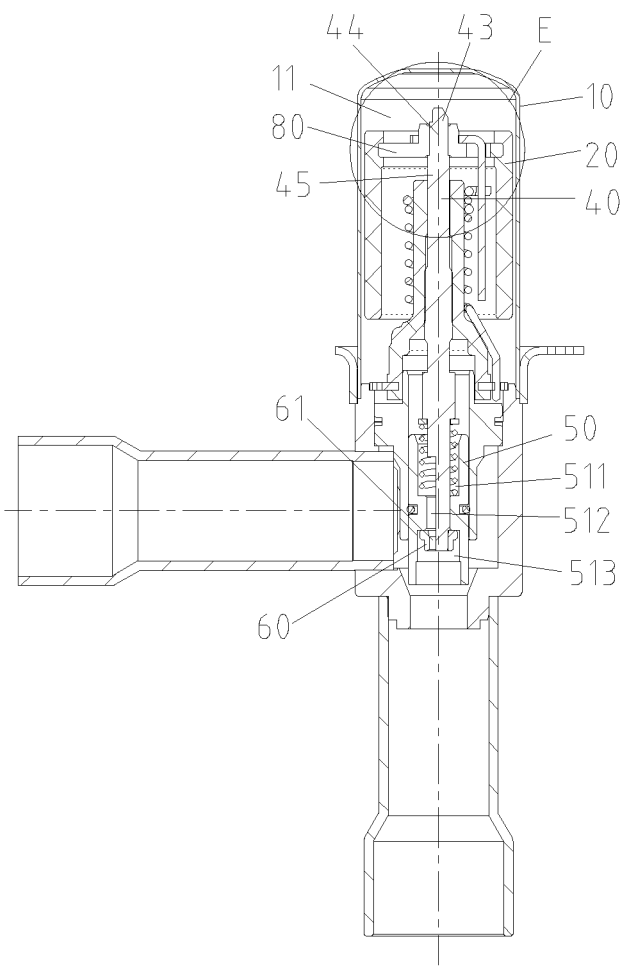
FIG. 6 shows another cross-sectional view of an electronic expansion valve provided according to the present disclosure.
Figure 7:
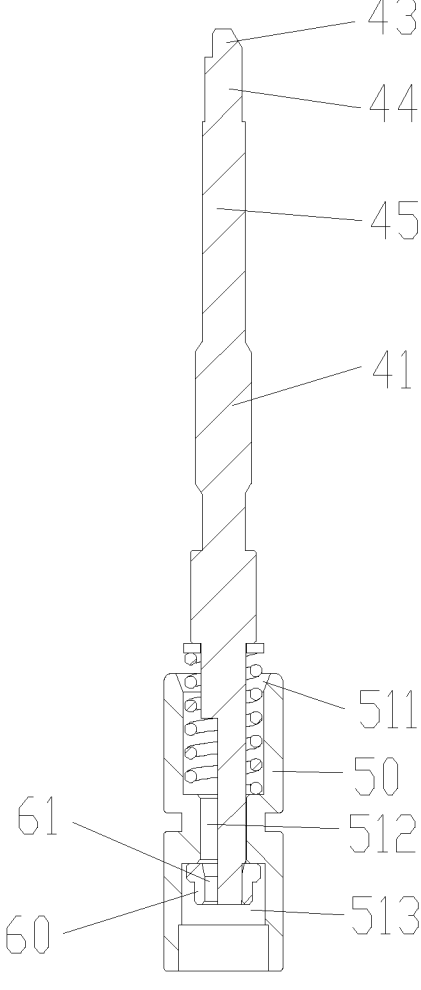
FIG. 7 shows a cross-sectional view of a screw rod, a fixing piece and a valve sleeve provided according to the present disclosure after assembly.
Figure 8:
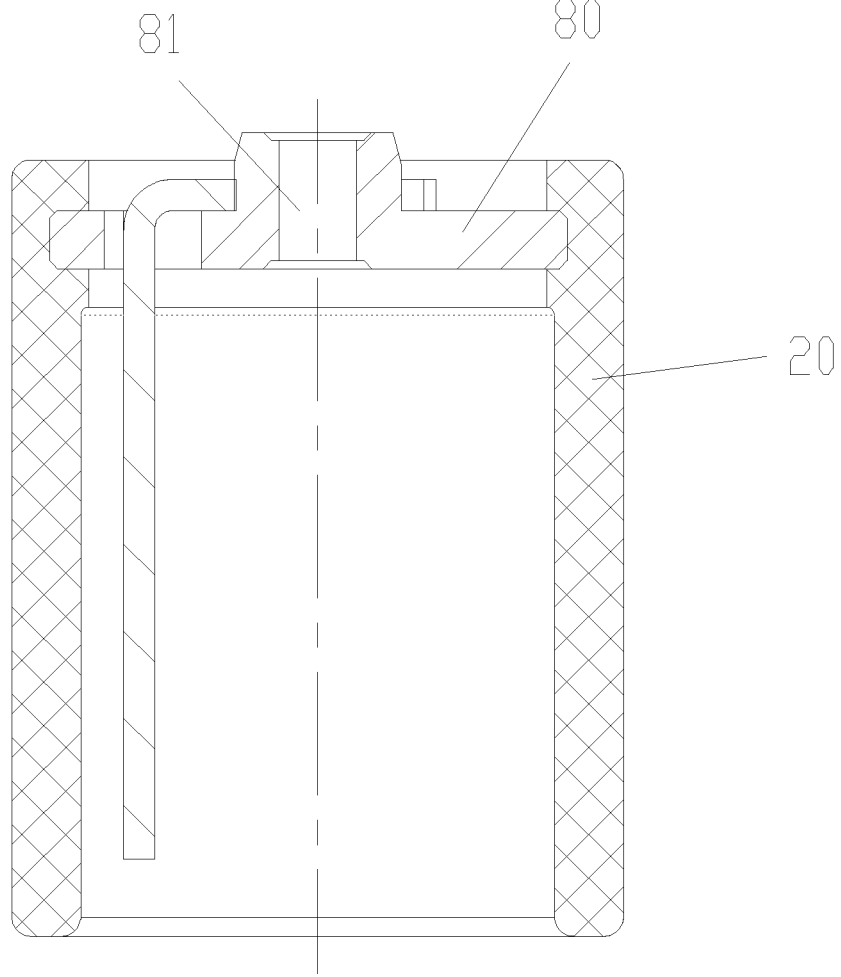
FIG. 8 shows a cross-sectional view of a rotor connecting plate and a rotor provided according to the present disclosure after assembly.
Figure 9:
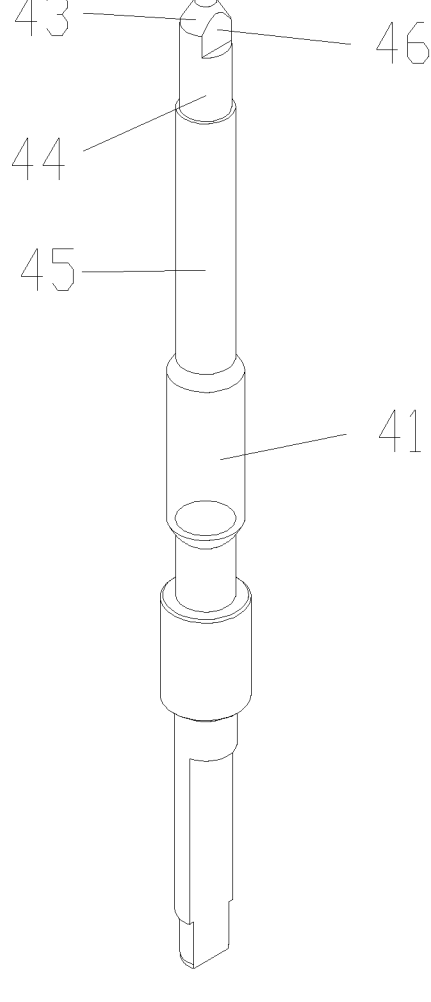
FIG. 9 shows a schematic structural diagram of a screw rod provided according to the present disclosure.

As shown in FIG. 4 and FIG. 5, a second embodiment of the present disclosure provides an electronic expansion valve, including a valve body 10, a screw rod 41, a rotor 20, and a valve sleeve 50. The valve body 10 has an accommodating cavity 11 and a valve port 12, and the valve port 12 is arranged to be in communication with the accommodating cavity 11. The valve sleeve 50 is movably arranged in the accommodating cavity 11, the valve sleeve 50 is located between the valve port 12 and the screw rod 41, and the screw rod 41 is in driving connection with the valve sleeve 50, such that the valve sleeve 50 closes or opens the valve port 12. The valve sleeve 50 has a blocking position and a maximum opening position that are arranged oppositely, where when the valve sleeve 50 is positioned at the maximum opening position, a spacing L3 is formed between an end of the screw rod 41 away from the valve sleeve 50 and an inner wall of the end of the valve body 10 away from the valve port 12, wherein the L3 is between 0.8 mm and 2.1 mm.

By applying the technical solution of the disclosure, the valve body 10, the screw rod 41, the rotor 20 and the valve sleeve 50 may have certain dimensional errors in the process of production and processing, or after a long time of use, the screw rod 41 generates a certain displacement deviation in the process of movement, and the above dimensional errors and displacement deviation may enable the valve sleeve 50 not to reach the maximum opening position, and an end of the screw rod 41 away from the valve sleeve 50 already abuts the inner wall of the end of the valve body 10 away from the valve port 12. The setting of the spacing L3 in the present solution can provide an avoidance space for the movement of the screw rod 41, so as to avoid the interference between the screw rod 41 and the inner wall of the end of the valve body 10 away from the valve port 12, thereby effectively ensuring the smoothness of valve opening. When the L3 is less than 0.8 mm, the avoidance space may be insufficient, and at this time, the contact between the screw rod 41 and the inner wall of the valve body 10 cannot be effectively avoided, and the smoothness of valve opening cannot be ensured. When the L3 is greater than 2.1 mm, a waste of raw materials of the valve body 10 may be caused, and the miniaturization of the product cannot be realized. Therefore, in the present solution, the L3 is set between 0.8 mm and 2.1 mm, which can not only ensure the smoothness of valve opening but also realize the miniaturization of the product. In some embodiments, the L3 may be set to 0.8 mm, 1.2 mm, 1.5 mm, 1.8 mm, and 2.1 mm. In the present embodiment, the L3 is set to 1.2 mm.

In some embodiments, the screw rod 41 is provided with a connecting end 221 and a driving end 222 that are arranged oppositely, the driving end 222 is arranged close to the valve port 12, the rotor 20 is connected with the connecting end 221, and the driving end 222 is in driving connection with the valve sleeve 50. When the electronic expansion valve is opened, the rotor 20 moves away from the valve port 12 while rotating along an axis thereof, the screw rod 41 moves with the rotor 20 while rotating with the rotor 20, and the nut sleeve 42 guides the movement and rotation of the screw rod 41 to ensure the smoothness of movement of the screw rod 41. The displacement deviation generated during the movement of the rotor 20 is reduced, and then the interference between the screw rod 41 and the inner wall of the valve body 10 is reduced, thereby ensuring the smoothness of valve opening.

In some embodiments, the rotor 20 includes a rotor body 211 and a rotor connecting plate 80, the rotor body 211 is arranged at a periphery of the screw rod 41, the rotor connecting plate 80 is located between the rotor body 211 and the screw rod 41, the rotor body 211 is connected with the rotor connecting plate 80, the rotor connecting plate 80 is provided with a mounting hole 81, and the connecting end 221 penetrates out of the mounting hole 81 and is connected with the rotor connecting plate 80. The connecting end 221 may also be located in the mounting hole 81, and in the present embodiment, the connecting end 221 penetrates out of the mounting hole 81 to ensure the stability of connection between the rotor connecting plate 80 and the screw rod 41, to ensure the accuracy of the displacement of the screw rod 41 and the valve sleeve 50 in the process of the movement, and to reduce the interference between the screw rod 41 and the inner wall of the valve body 10 in the process of opening the electronic expansion valve, thereby ensuring the smoothness of valve opening process.

In some embodiments, the rotor connecting plate 80 has a first end surface and a second end surface that are arranged oppositely along an axis direction of the rotor 20, the first end surface is arranged toward the valve port 12, an interval between the first end surface and an end surface of the connecting end 221 is L4, wherein the L4 is between 4.9 mm and 5.5 mm. In some embodiments, an inner peripheral surface of the rotor body 211 is provided with an annular clamping groove, the rotor connecting plate 80 includes a first section body and a second section body which are connected with each other, the first section body is arranged close to the nut sleeve 42, a diameter of the first section body is greater than a diameter of the second section body, a periphery of the first section body is embedded in the clamping groove, an end surface of the second section body away from the first section body is arranged to protrude out of the rotor body 211, and the mounting hole 81 is coaxial with the rotor connecting plate 80 and is arranged to penetrate through the first section body and the second section body. When the L4 is less than 4.9 mm, the connection stability between the rotor connecting plate 80 and the rotor body 211 is poor, which may result in poor stability of opening and closing of the electronic expansion valve. When the L4 is greater than 5.5 mm, the connection stability between the rotor connection plate 80 and the rotor body 211 cannot be further increased, which results in that the raw materials of the rotor connecting plate 80 are wasted, and a processing cost of the rotor connecting plate 80 is increased. In the present solution, the L4 is set within the above range, which can not only ensure the stability of the electronic expansion valve during opening and closing but also avoid the waste of the raw materials of the rotor connecting plate 80. In some embodiments, the L4 may be set to 4.9 mm, 5.1 mm, 5.3 mm, and 5.5 mm, and the length of the screw rod 41 protruding out of the rotor connecting plate 80 may be set to 1.2 mm, 1.5 mm, and 1.8 mm. In the present embodiment, the L4 is set to 5.3 mm, and the length of the screw rod 41 protruding out of the rotor connecting plate 80 is set to 1.5 mm.

In some embodiments, along the axis direction of the screw rod 41, when the valve sleeve 50 is positioned at the blocking position, an interval between an end surface of a side of the rotor connecting plate 80 close to the valve port 12 and an end surface of an end of the nut sleeve 42 away from the valve port 12 is L5, where the L5 is between 0.7 mm and 2 mm. When the electronic expansion valve is closed, the rotor body 211 moves close to the valve port 12 while rotating, and the rotor connecting plate 80 moves with the rotor body 211 until the valve sleeve 50 is at the blocking position. The valve body 10, the screw rod 41 and the rotor body 211 may have certain dimensional errors in the process of processing, or after a long time of use, the rotor body 211 may have a certain displacement deviation in the process of movement thereof, and the above dimensional errors and displacement deviation may enable the valve sleeve 50 not to reach the blocking position, and the rotor connecting plate 80 is already in contact with the nut sleeve 42. The setting of the L5 in the present solution can provide an avoidance space for the movement of the rotor connecting plate 80, so as to avoid the interference between the rotor connecting plate 80 and the end of the nut sleeve 42 away from the valve port 12, thereby effectively ensuring the smoothness of valve opening. When the L5 is less than 0.7 mm, the avoidance space may be insufficient, and at this time, the contact between the rotor connecting plate 80 and the nut sleeve 42 cannot be effectively avoided, and the smoothness of valve closing cannot be ensured. When the L5 is 2 mm, a sufficient avoidance space is provided for the movement of the rotor connecting plate 80. When the L5 is greater than 2 mm, the length of the screw rod 41 is too long, such that the raw materials of the screw rod 41 is wasted. Therefore, the L5 is set between 0.7 mm and 2 mm, which can not only avoid the interference between the rotor connecting plate 80 and the nut sleeve 42 but also ensure the reasonable length of the screw rod 41, thereby avoiding the waste of the raw materials of the screw rod 41. In some embodiments, the L5 may be set to 0.7 mm, 1.3 mm, 1.7 mm, and 2 mm. In the present embodiment, the L5 is set to 1.5 mm.

In some embodiments, a displacement of the valve sleeve 50 moving from the blocking position to the maximum opening position is S, the nut sleeve 42 has a first threaded section, and a length of the first threaded section is L6, wherein $1.5 \ S \leq L6 \leq 2.5 \ S$. In some embodiments, the nut sleeve 42 has a first guiding section, the first threaded section, and a mounting section which are communicated in sequence along the axis direction, the mounting section is arranged close to the valve port 12, the first guiding section is in clearance fit with the screw rod 41, an inner diameter of the mounting section is greater than that of the first threaded section, and the mounting section is used for being in fixed fit with the valve body 10. In the process of the movement of the screw rod 41, the first guiding section is in guiding fit with the screw rod 41, and the first threaded section is in threaded connection with the screw rod 41, so as to ensure the stability of the movement and rotation of the screw rod 41. The nut sleeve 42 and the valve body 10 may have dimensional errors in the process of processing, and the screw rod 41 may have a displacement deviation in the process of the switching of the electronic expansion valve from the opening state to the closing state. When the L6 is less than 1.5 S, the electronic expansion valve may not be able to be fully opened or closed, thereby affecting a normal operation of a refrigeration system. When the L6 is 2.5 S, it is enough to ensure that the electronic expansion valve is fully opened or closed. When the L6 is greater than 2.5 S, the length of the first threaded section is too long, and the processing cost of the nut sleeve 42 is increased. Therefore, the L6 is set between 1.5 S and 2.5 S, which can not only ensure that the electronic expansion valve is fully opened or closed but also reduce the processing cost of the nut sleeve 42. In some embodiments, the L6 may be set to 1.5 S, 2 S, and 2.5 S. In the present embodiment, the L6 is set to 2.1 S.

In some embodiments, the screw rod 41 has a second threaded section, the second threaded section is in threaded connection with the first threaded section, and a length of the second threaded section is L7, where $1.5 \ S \leq L7 \leq 2.5 \ S$. In some embodiments, the screw rod 41 has a second guiding section, a second threaded section and a driving section which are connected in sequence, the second guiding section is in clearance fit with the first guiding section, the second threaded section is in threaded connection with the first threaded section, and the driving section is in driving connection with the valve sleeve 50. When the L7 is less than 1.5 S, the second threaded section may cannot be in threaded connection with the first thread section effectively, and then the electronic expansion valve cannot not be fully opened or closed, which affects the normal operation of the refrigeration system. When the L7 is 2.5 S, it is enough to ensure that the electronic expansion valve is fully opened or closed. When the L7 is greater than 2.5 S, the length of the second threaded section is too long, and the processing cost of the screw rod 41 is increased. When the lengths of the first threaded section and the second threaded section are both greater than 2.5 S, a matching length of the first threaded section and the seconded thread section is too long, the resistance to the movement of the screw rod 41 is increased, and a response time of the opening or closing of the electronic expansion valve is increased. Therefore, the L7 is set within the above range, which can not only ensure that the electronic expansion valve is fully opened or closed but also ensure the flexibility of the response of the electronic expansion valve. In some embodiments, the L7 may be set to 1.5 S, 2 S and 2.5 S.

In some embodiments, the L7 is greater than the L6, and a difference between the L7 and the L6 is between 0 mm and 4 mm. When the length of the L7 is less than the length of the L6, the screw rod 41 may be stuck in the process of the movement and rotation of the screw rod 41, which affects the smoothness of the movement of the screw rod 41, thereby affecting the smoothness of the movement of the valve sleeve 50. When the difference between the L7 and the L6 is greater than 2 mm, the length of the second threaded section is too long, such that the processing cost of the screw rod 41 is increased. Therefore, the difference between the L7 and the L6 is set between 0 mm and 2 mm, which can not only ensure the smoothness of the movement of the screw rod 41 and the smoothness of valve opening and valve closing but also reduce the processing cost of the screw rod 41. The L7 may be equal to the L6, and the difference between the L7 and the L6 may also be set to 1 mm, 2 mm, and 4 mm. In the present embodiment, the difference between the L7 and the L6 is set to 2 mm.

By applying the technical solution of the disclosure, the smoothness of valve opening and valve closing can be ensured, and the miniaturization of the product can also be realized.

As shown in FIG. 6 to FIG. 9, the electronic expansion valve further includes a rotor connecting plate 80. The rotor connecting plate 80 is located in the accommodating cavity 11, an outer peripheral edge of the rotor connecting plate 80 is connected with the rotor 20, the rotor connecting plate 80 is provided with a mounting hole 81 formed in an axis direction, the screw rod 41 has a first section 43, a second section 44 and a third section 45 that are arranged in sequence along the axial direction, the second section 44 is arranged in the mounting hole 81 in a penetrating manner and is connected with the mounting hole 81, a second tangential structure 46 is arranged on a side wall of the screw rod 41, the second tangential structure 46 extends to the second section 44 from the first section 43, and the second tangential structure 46 is used to be matched with a fixture for positioning, wherein a distance between an end surface of the third section 45 close to the second section 44 and an end part of the mounting hole 81 away from the third section 45 is L8, and a distance between the end surface of the third section 45 close to the second section 44 and an end of the second tangential structure 46 close to the third section 45 is L9, where L9–L8≥0.15 mm.

In the embodiment of the present disclosure, two ends of the mounting hole 81 are respectively provided with counter bores, and the L8 is particularly a distance between the centers of the two counter bores, wherein the counter bore close to the third section 45 can prevent the third section 45 from being damaged due to collision with a lower end surface of the rotor connecting plate 80 during positioning, thereby ensuring the positioning accuracy. The counter bore away from the third section 45 can prevent the second section 44 from being damaged due to collision with an upper end surface of the rotor connecting plate 80 during welding, thereby ensuring the overall welding accuracy.

When L9–L8≤0.15 mm, the distance between the second tangential structure 46 and the counter bore is reduced, thereby reducing a welding space between the screw rod 41 and the mounting hole 81 to affect a structural strength after the screw rod 41 and the mounting hole 81 are welded. Therefore, in some embodiments of the present disclosure, by setting L9–L8 to be ≥ 0.15 mm, an effective distance between the screw rod 41 and the mounting hole is increased, thereby providing a relatively large welding area between the counter bore and the screw rod 41, which facilitates the welding of the screw rod 41 and the mounting hole 81, and can effectively improve the accuracy of the welding of the screw rod 41 and the rotor connecting plate 80. In some embodiments, the value of L9–L8 may be 0.15 mm, 0.2 mm or 0.3 mm.

Through the above structure, the screw rod 41 is connected with the mounting hole 81 in the rotor connecting plate 80, and the second tangential structure 46 on the screw rod 41 can be matched with the fixture for positioning and connection, such that the positioning effect of the screw rod 41 can be improved. The matching relationship between the L8 and the L9 is set to be L9–L8≥0.15 mm, such that the mounting stability of the screw rod 41 and the rotor connecting plate 80 can be improved, and then the welding accuracy of the screw rod 41 and the rotor connecting plate 80 can be effectively improved, thereby ensuring the stability of the device during operation.

Furthermore, the L8 is between 1 mm and 3 mm. Such arrangement can ensure an effective fitting length between the screw rod 41 and the mounting hole 81, thereby improving the positioning reliability of the screw rod 41. In some embodiments, the value of the L8 may be 1 mm, 2 mm or 3 mm.

In some embodiments, the first section 43 is a tapered section, and a diameter of the first section 43 is gradually increased toward a direction close to the second section 44. Through the above structure, the screw rod 41 can be guided in the process of mounting of the screw rod 41 and the mounting hole 81, thereby facilitating the assembly of the device and improving the mounting efficiency of the device.

In some embodiments, a diameter of the second section 44 is D9, and the D9 is between 1.2 mm and 4 mm. The D9 is set between 1.2 mm and 4 mm, which can not only ensure the connection stability between the screw rod 41 and the mounting hole 81 but also reduce the processing difficulty of the screw rod 41 and reduce the production cost. Particularly, the value of the D9 may be 1.2 mm, 2 mm or 4 mm.

In some embodiments, a diameter of an end surface of the first section 43 away from the second section 44 is D10, wherein the D10>0.5 mm. Such arrangement facilitates the connection and positioning of the screw rod 41 and the fixture, thereby welding the screw rod 41 to other components conveniently, and ensuring the processing accuracy during welding. In some embodiments, the value of the D10 may be 0.6 mm, 0.7 mm, and 0.8 mm.

Figure 10:
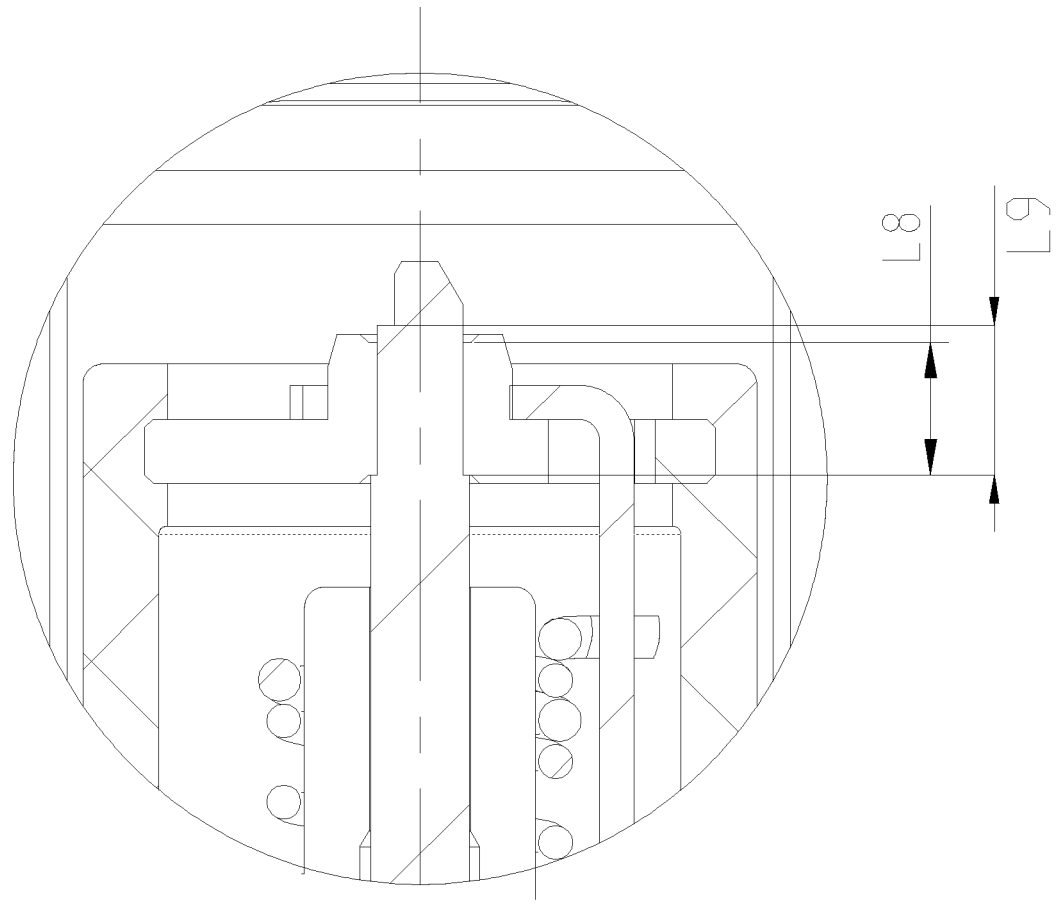
FIG. 10 shows a schematic dimension view at E in FIG. 6.
Figure 11:
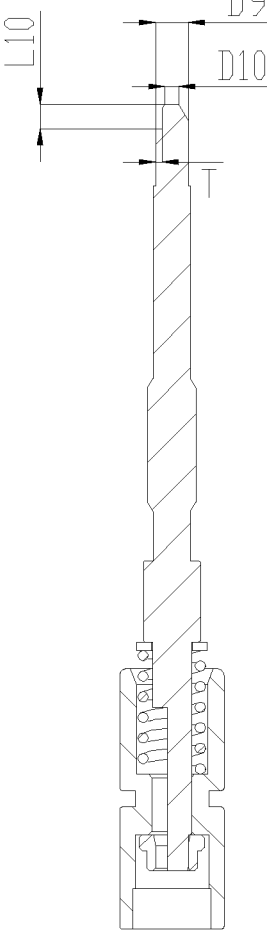
FIG. 11 shows a schematic dimension view of a screw rod provided according to the present disclosure.

As shown in FIG. 10 and FIG. 11, a radial depth of the second tangential structure 46 on the second section 44 is T, where the T<0.5*(D9–D10). By setting the radial depth T of the second tangential structure 46 to be T<0.5*(D9–D10), a relative displacement between the screw rod 41 and the fixture is effectively prevented, and the stability of the screw rod 41 and the fixture after connection is ensured.

In some embodiments, a distance between an end surface of the first section 43 away from the second section 44 and the end of the second tangential structure 46 close to the third section 45 is L10, where the L10≥1 mm. Such arrange-ment can further ensure the stability of the screw rod 41 and the fixture after positioning, such that the positioning of the screw rod 41 connected to other components is more reli-able. Particularly, the value of the L10 may be 1 mm, 2 mm or 3 mm.

In some embodiments, a diameter of the third section 45 is greater than a diameter of the second section 44. The above structure is set, which facilitates improving the struc-tural strength of the screw rod 41, thereby ensuring the performance of the device during operation.

In the present embodiment, the fixture is positioned with the first section 43 and the second section 44 of the screw rod 41, which facilitates the welding of the other end of the screw rod 41 to the fixing piece 60, and then the fixture is fixed to the screw rod 41 through the mounting hole 81, such that the screw rod 41 may be fixedly welded to the rotor connecting plate 80, thereby improving the welding accu-racy of the screw rod 41 and the rotor connecting plate 80, and ensuring the stability of the device during operation.

It should be noted that the terms used herein are for the purpose of describing particular embodiments only and are not intended to be limiting of the exemplary embodiments according to the present disclosure. As used herein, the singular forms are intended to include the plural forms as well, unless the context clearly dictates otherwise. It should also be understood that the terms "comprises" and/or "com-prising," when used in this specification, specify the pres-ence of features, steps, operations, elements, components, and/or groups thereof.

The relative arrangement of parts and steps, numerical expressions, and values set forth in these embodiments do not limit the scope of the present disclosure unless specifi-cally stated otherwise. Meanwhile, it should be understood that the dimensions of the various parts shown in the drawings are not drawn to scale for ease of description. Techniques, methods, and devices known to those of ordi-nary skill in the pertinent art may not be discussed in detail, but should be considered part of the authorization specifi-cation, where appropriate. In all examples shown and dis-cussed herein, any particular value is to be construed as exemplary only and not limiting. Therefore, other examples of exemplary embodiments may have different values. It should be noted that like reference numerals and letters refer to like items in the following drawings, and therefore, once an item is defined in one drawing, it need not be further discussed in subsequent drawings.

In the description of the present disclosure, it should be understood that the orientations or positional relationships indicated by directional terms such as "front, rear, upper, lower, left, right," "lateral, vertical, perpendicular, horizon-tal," and "top, bottom," etc., are generally based on the orientations or positional relationships shown in the draw-ings, merely for the convenience of describing the present disclosure and simplifying the description, and where not stated to the contrary, these words of orientation do not indicate or imply that the devices or elements referred to must have or be constructed or operated in a particular orientation, and are therefore not to be construed as limiting the scope of protection of the present disclosure; and the words of orientation "in" and "out" refer to inside and outside with respect to the outline of the components them-selves.

For convenience of description, spatially relative terms may be used herein, such as "on . . . " above . . . ", "on . . . upper surface", "upper . . . ", etc., are used to describe the spatial relationship of one device or feature to another device or feature as shown in the figures. It should be understood that the spatially relative terms are intended to encompass different orientations of the device in use or operation in addition to the orientation depicted in the figures. For example, if the devices in the drawings are inverted, devices described as being "above the other device or configuration" or "on the other device or configuration" will later be positioned as being "below the other device or configuration" or "under the other device or configuration". Thus, the exemplary term "above" may include two orien-tations of "above . . . " and "below . . . ". The device may also be positioned in other different ways (rotated 90 degrees or in other orientations), and the spatial relative descriptions used herein are interpreted accordingly.

In addition, it should be noted that the use of words such as "first" and "second" to define parts and components is only for the convenience of distinguishing the corresponding parts and components, and the above words have no special meaning unless otherwise stated, so they cannot be under-stood as limiting the scope of protection of the present disclosure.

The above description is only a preferred embodiment of the present disclosure and is not intended to limit the present disclosure, and various modifications and changes can be made to the present disclosure by those skilled in the art. Any modification, equivalent substitution, improvement, etc. within the spirit and principle of the present disclosure shall be included in the scope of protection of the present disclosure.

What is claimed is:

1. An electronic expansion valve, comprising:
a valve body, the valve body having an accommodating cavity and a valve port, and the accommodating cavity being in communication with the valve port;
a rotor, the rotor being arranged in the accommodating cavity;
a stator assembly, the stator assembly being arranged outside the valve body in a sleeving manner, and the stator assembly being arranged corresponding to the rotor;
a screw rod assembly, the screw rod assembly being arranged in the accommodating cavity, the screw rod assembly comprising a screw rod and a nut sleeve, the nut sleeve being fixed to the valve body, the screw rod being arranged in the nut sleeve in a penetrating manner and being in threaded connection with the nut sleeve, the rotor being fixedly connected to an end of the screw rod away from the valve port, and the rotor driving the screw rod to rotate along the nut sleeve such that the screw rod and the rotor move in a direction toward or away from the valve port; and
a valve sleeve, the screw rod being in driving connection with the valve sleeve, and the valve sleeve being used to block or open the valve port,
wherein when the valve port is in a fully close state, a number of pulses is 0, when the valve port is in a fully open state, a number of pulses is A, and when a central line of the stator assembly that is perpendicular to an axis coincides with a central line of the rotor that is perpendicular to the axis, a corresponding number of pulses is B, wherein 0.3*A≤B≤0.7*A.

2. The electronic expansion valve as claimed in claim 1, wherein B=0.5*A.

3. The electronic expansion valve as claimed in claim 1, wherein a length of the rotor along an axial direction is L1, the stator assembly is provided with an upper polar plate and a lower polar plate that are arranged at an interval along the axial direction, and a distance between the upper polar plate and the lower polar plate is L2, wherein L2 is greater than L1.

4. The electronic expansion valve as claimed in claim 3, wherein 0.2 mm≤L2−L1≤1 mm; or 18 mm≤L1≤23 mm.

5. The electronic expansion valve as claimed in claim 1, wherein an outer diameter of the rotor is D1, and an inner diameter of the accommodating cavity is D2, wherein 0.3 mm≤D2−D1≤1 mm; or an outer diameter of the rotor is D1, wherein 13 mm≤D1≤18 mm.

6. The electronic expansion valve as claimed in claim 1, wherein an outer diameter of the valve body is D3, and an inner diameter of the stator assembly is D4, wherein 0.05 mm≤D4−D3≤0.5 mm.

7. The electronic expansion valve as claimed in claim 1, wherein a balancing channel is arranged in the valve sleeve, and the balancing channel can enable two ends of the valve sleeve to be communicated; wherein the valve sleeve is internally provided with a through hole, the through hole comprises a first hole section, a second hole section and a third hole section that are arranged in sequence, a diameter of the first hole section and a diameter of the third hole section are greater than a diameter of the second hole section, an end of the screw rod close to the valve port is arranged in the third hole section in a penetrating manner, a fixing piece is fixedly connected to the end of the screw rod close to the valve port, a diameter of the fixing piece is greater than the diameter of the second hole section, the fixing piece is arranged at an end of the third hole section away from the valve port, a connecting hole is formed in the fixing piece, an end part of the screw rod is arranged in the connecting hole in a penetrating manner, a first tangential structure is arranged on a side wall of the end of the screw rod close to the valve port, the first tangential structure extends to the first hole section, a first gap is formed between the first tangential structure and an inner wall of the through hole, a second gap is formed between the connecting hole and the first tangential structure, the first gap is in communication with the second gap, and the first gap and the second gap form the balancing channel, so as to balance air pressure at two ends of the valve sleeve.

8. The electronic expansion valve as claimed in claim 1, wherein the valve sleeve has a blocking position and a maximum opening position that are arranged oppositely, when the valve sleeve is positioned at the maximum opening position, a spacing L3 is formed between an end of the screw rod away from the valve sleeve and an inner wall of an end of the valve body away from the valve port, wherein the spacing L3 is between 0.8 mm and 2.1 mm.

9. The electronic expansion valve as claimed in claim 8, wherein the screw rod is provided with a connecting end and a driving end that are arranged oppositely, the driving end is arranged close to the valve port, the rotor is connected with the connecting end, and the driving end is in driving connection with the valve sleeve.

10. The electronic expansion valve as claimed in claim 9, wherein the rotor comprises a rotor body and a rotor connecting plate, the rotor body being arranged at a periphery of the screw rod, the rotor connecting plate being located between the rotor body and the screw rod, the rotor body being connected with the rotor connecting plate, the rotor connecting plate being provided with a mounting hole, and the connecting end penetrating out of the mounting hole and being connected with the rotor connecting plate.

11. The electronic expansion valve as claimed in claim 9, wherein the rotor comprises a rotor body and a rotor connecting plate, the rotor connecting plate has a first end surface and a second end surface that are arranged oppositely along an axis direction of the rotor, the first end surface is arranged toward the valve port, and an interval between the first end surface and an end surface of the connecting end is L4, wherein the L4 is between 4.9 mm and 5.5 mm.

12. The electronic expansion valve as claimed in claim 10, wherein when the valve sleeve is positioned at the blocking position along an axis direction of the screw rod, an interval between an end surface of a side of the rotor connecting plate close to the valve port and an end surface of an end of the nut sleeve away from the valve port is L5, wherein the L5 is between 0.7 mm and 2 mm.

13. The electronic expansion valve as claimed in claim 12, wherein a displacement of the valve sleeve moving from the blocking position to the maximum opening position is S, the nut sleeve has a first threaded section, and a length of the first threaded section is L6, wherein 1.5 S≤L6≤2.5 S; wherein the screw rod has a second threaded section, the second threaded section is in threaded connection with the first threaded section, and a length of the second threaded section is L7, wherein 1.5 S≤L7≤2.5 S.

14. The electronic expansion valve as claimed in claim 13, wherein the L7 is greater than the L6, and a difference between the L7 and the L6 is between 0 mm and 4 mm.

15. The electronic expansion valve as claimed in claim 1, further comprising: a rotor connecting plate, which is located in the accommodating cavity, wherein an outer peripheral edge of the rotor connecting plate is connected with the rotor, the rotor connecting plate is provided with a mounting hole formed in an axis direction, the screw rod has a first section, a second section and a third section that are arranged in sequence along the axial direction, the second section is arranged in the mounting hole in a penetrating manner and is connected with the mounting hole, a second tangential structure is arranged on a side wall of the screw rod, the second tangential structure extends to the second section from the first section, and the second tangential structure is configured to be matched with a fixture for positioning, wherein a distance between an end surface of the third section close to the second section and an end part of the mounting hole away from the third section is L8, and a distance between the end surface of the third section close to the second section and an end of the second tangential structure close to the third section is L9, wherein L9−L8≥0.15 mm.

16. The electronic expansion valve as claimed in claim 15, wherein L8 is between 1 mm and 3 mm; or, the first section is a tapered section, and a diameter of the first section is gradually increased toward a direction close to the second section;

or, a diameter of the third section is greater than a diameter of the second section.

17. The electronic expansion valve as claimed in claim 15, wherein a diameter of the second section is D9, wherein D9 is between 1.2 mm and 4 mm.

18. The electronic expansion valve as claimed in claim 17, wherein a diameter of an end surface of the first section away from the second section is D10, wherein D10>0.5 mm.

19. The electronic expansion valve as claimed in claim 18, wherein a radial depth of the second tangential structure on the second section is T, wherein T<0.5*(D9−D10); or a distance between the end surface of the first section away from the second section and an end of the second tangential structure close to the third section is L10, wherein L10≥1 mm.

\* \* \* \* \*